(12) United States Patent
Hahn et al.

(10) Patent No.: US 8,031,907 B2
(45) Date of Patent: Oct. 4, 2011

(54) METHOD AND DEVICE FOR MONITORING VEHICLE SURROUNDINGS

(75) Inventors: Wolfgang Hahn, Schwabhausen (DE); Thomas Weidner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1092 days.

(21) Appl. No.: 11/890,504

(22) Filed: Aug. 7, 2007

(65) Prior Publication Data
US 2007/0280506 A1 Dec. 6, 2007

Related U.S. Application Data

(63) Continuation of application No. PCT/EP2006/000134, filed on Jan. 10, 2006.

(30) Foreign Application Priority Data

Feb. 11, 2005 (DE) .......................... 10 2005 006 287

(51) Int. Cl.
*G06K 9/00* (2006.01)
*H04N 7/00* (2006.01)

(52) U.S. Cl. ........................................ 382/104; 348/115
(58) Field of Classification Search .................. None
See application file for complete search history.

(56) References Cited

U.S. PATENT DOCUMENTS

| | | | |
|---|---|---|---|
| 7,153,268 B2 * | 12/2006 | Li et al. .......................... | 600/455 |
| 2002/0075387 A1 | 6/2002 | Janssen | |
| 2003/0098909 A1 | 5/2003 | Fritzsche et al. | |
| 2004/0075544 A1 | 4/2004 | Janssen | |
| 2004/0257442 A1 | 12/2004 | Eggers et al. | |

FOREIGN PATENT DOCUMENTS

| | | |
|---|---|---|
| DE | 199 50 033 A1 | 5/2001 |
| DE | 100 59 313 A1 | 6/2002 |
| DE | 100 59 315 A1 | 6/2002 |
| DE | 101 58 415 A1 | 6/2003 |
| DE | 102 03 413 A1 | 8/2003 |
| EP | 1 400 409 A2 | 3/2004 |
| EP | 1 460 454 A2 | 9/2004 |
| EP | 1 500 557 A1 | 1/2005 |
| EP | 1500557 A1 * | 1/2005 |
| WO | WO 2004 024498 A1 | 3/2004 |

OTHER PUBLICATIONS

International Search Report dated Jun. 22, 2006 with English translation of relevant portion (Six (6) pages).
German Search Report dated Apr. 6, 2006 with English translation of relevant portion (Nine (9) pages).
Lagendijk, Reginald L., et al, "Video Enhancement and Restoration," Handbook of Image and Video Processing, 2000, pp. 227-231, Academic Press (XP-002372878).

* cited by examiner

*Primary Examiner* — Samir Ahmed
*Assistant Examiner* — Fred Hu
(74) *Attorney, Agent, or Firm* — Crowell & Moring LLP

(57) ABSTRACT

A device is provided for monitoring surroundings of a vehicle with at least one camera, an image processing unit, and an image display unit. The image processing unit is operatively configured for reducing noise components in the images, recorded by the camera. The reducing of the noise components is accomplished by image grading, during which an averaging of a number of images occurs. The number of images, processed for the image grading, is variable.

19 Claims, 1 Drawing Sheet

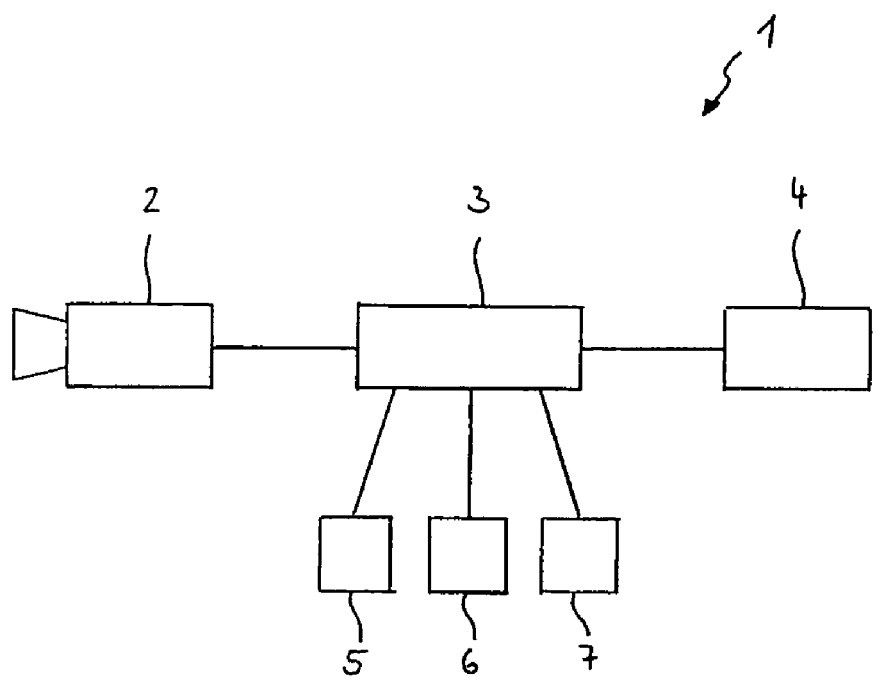

METHOD AND DEVICE FOR MONITORING VEHICLE SURROUNDINGS

CROSS-REFERENCE TO RELATED APPLICATIONS

This application is a continuation of PCT International Application No. PCT/EP2006/000134, filed on Jan. 10, 2006, which claims priority under 35 U.S.C. §119 to German Application No. 10 2005 006 287.3, filed Feb. 11, 2005, the entire disclosures of which are expressly incorporated by reference herein.

BACKGROUND AND SUMMARY OF THE INVENTION

The invention relates to a method and a device for monitoring the surroundings of a vehicle.

There exist a plurality of systems for monitoring the surroundings of a vehicle. Such systems are used, for example, to implement an accident prevention (so-called precrash) system, an automatic cruise control, and to monitor the blind angle with respect to the driver's field of vision (the so-called "blind spot"). To this end, systems are used that avail themselves of various sensors. Some examples are radar sensors, LIDAR sensors, ultrasonic sensors, and video sensors.

It is known to display the images, recorded by video cameras, directly on an image display unit in the interior of the vehicle or to make slight adjustments with respect to the image content. Such adjustments relate, for example, to the brightness and the contrast of the image content.

Owing to the direct display of the image contents, it is mandatory for safety considerations that the recording optics exhibit only slight optical distortions. Only then is it guaranteed that the viewer—generally the driver of the vehicle—, can easily interpret the image content.

So-called "image grading" is used for optimizing the noise in images, provided by a camera in the visible or infrared spectral range. Owing to the image grading, which corresponds to a temporal integration or averaging of a number of individual images, the signal-to-noise ratio of the images, represented in an image display unit, can be improved. Therefore, in order to reduce the noise components in an image to be represented in the image display unit, several images are recorded by the camera and subjected to image processing, during which a number of images are processed. With the use of computer technology and/or during the digital image processing, this can also be achieved by averaging the pixel data, especially in consideration of their brightness in the respective images, and the color data, which may or may not be included. This does not have to be done necessarily pixel-by-pixel, but rather can be done by averaging the simultaneous and locally identical pixel regions of a number of images.

In order to achieve good results, the number of images should be taken from approximately the same solid angle in order to avoid loss of detail in the image to be represented in the image display unit. This requirement is fulfilled for a camera that is moving along a vehicle's longitudinal axis in a vehicle. Blurring of the image, represented in the image display unit, owing to the solid angle that has changed slightly due to the longitudinal movement is barely perceived by the driver of the vehicle.

However, the situation changes in the event of large changes in the solid angle, for example when driving along a curve. Due to the high angular speed, a camera-recorded object is always somewhat offset from image to image during the recording process. In the case of image grading, this offset leads to blurring, primarily in the edge region, and may perhaps lead to a distortion of the objects, a state that manifests itself through a ghosting effect in the image display unit. Such a deteriorated image quality can make it difficult for the viewer of the images—the driver of the vehicle—to interpret the image contents in the image display unit and, thus, leads to a decline in the driver's ability to detect important objects, such as pedestrians, bikers or animals.

German patent document DE 100 59 315 A1 discloses an arrangement for monitoring the surroundings of a vehicle with at least one wide angle view camera, one image processing unit with a mechanism for removing the camera-recorded images and one image display unit. In such an arrangement, the mechanism works in an adaptive manner on the basis of a selected section of the image and on the basis of a selected direction of gaze. The arrangement ensures that the distortions, generated by the wide angle lens, are rectified to the effect that an arbitrary two dimensional imaging of the plane of the camera image is transformed into the image plane of the display image of an image display unit. The adaptation of a selected section of the image and/or a selected direction of gaze can be performed automatically on the basis of the steering angle or the speed of the vehicle. An image optimization does not take place beyond the rectification of the image, recorded by a wide angle lens.

Therefore, the object of the present invention is to provide a device and a method for monitoring the surroundings of a vehicle. With this method and device, the image quality of the camera-recorded images may be optimized for representation.

According to the invention, a device is provided for monitoring the surroundings of a vehicle with at least one camera, one image processing unit, and one image display unit. A means for reducing the noise components in the camera-recorded images in the image display unit is operatively configured for carrying out a reduction in the noise components by image grading, during which an averaging of a number of images ensues. The number of images, processed for the image grading, is variable. The variability of the image grading enables a situation-dependent optimal image grading, so that the blurring on the edges and the distortions of the objects owing to the ghosting effect may be reliably avoided.

According to a preferred design, the means for reducing the noise components is designed for carrying out an adaptive adaptation of the number of images, processed for image grading, as a function of at least one driving dynamic parameter of the vehicle. An adaptive adaptation of the image grading (that is, the variation of the integration time and/or a change in the number of images—also called the grading depth), which is subjected to an averaging, as a function of one or more driving dynamic parameters, such as the speed, the steering wheel angle or the yaw rate, makes possible the desired optimization. The degree of optimization and, thus, the quality of the image, represented in the image display unit, may be made a function of the driving dynamic state of the vehicle. A maximum noise optimization is practical, for example, at a low speed and small steering wheel angle, as is typical for driving straight ahead in the inner-city area. In the event of cross country or freeway driving, which usually takes place at a higher speed and smaller steering wheel angle, a somewhat lower optimization is sufficient. If the noise optimization is reduced, the image processing unit has a somewhat smaller computing load. The somewhat lower image quality is acceptable in this driving situation. The least image grading is performed at a low speed and a large steering wheel angle. Such a situation corresponds, for example, to turning off into the city at a high yaw rate. This significantly reduces, as compared to conventional devices, the effect of "smearing" the image, displayed in the image display unit. Even though such a driving situation includes a certain amount of noise, the driver's detection capacity is not automatically reduced, since the human eye reacts very sensitively to relative movements.

Another practical design provides at least one sensor for capturing the driving dynamic data. The sensor is coupled to the image processing unit. In this design, the driving dynamic parameters are determined on the basis of sensor values, which are determined by the at least one sensor and are transmitted to the image processing unit. According to one design, the at least one sensor can be a speed sensor. In this case, the driving dynamic parameter is a function of the speed value, determined by the sensor. In another design, the sensor may be designed as a sensor for determining the steering wheel angle. In this case, the driving dynamic parameter is a function of the angle, determined by the sensor. In another design, the at least one sensor is a sensor for determining the yaw rate of the vehicle; and the driving dynamic parameter is a function of the yaw rate, determined by the sensor. A device, according to the invention, may exhibit any combination of these types of sensors. Even the presence of one single type of these sensors is adequate. Preferably, a combination including a speed sensor and a sensor for determining the steering wheel angle is utilized.

Another practical embodiment of the device provides that the driving dynamic parameters for influencing the number of images that are processed for image grading are computed by a computer of the image processing unit. In this design the sensor values, transmitted by the at least one sensor to the image processing unit, are received and subjected to a specified algorithm in order to determine a driving dynamic parameter that corresponds to the driving situation, in order to vary the grading depth of the image grading when such a parameter is on hand.

Another design provides that a plurality of driving dynamic parameters are stored in a storage unit of the processing unit. The parameters can be read by the image processing unit in reaction to the reception of one or more sensor values for further processing. Therefore, a matrix including the driving dynamic parameters and, for example, the speed, the steering wheel angle, and/or the yaw rate is stored in the storage unit. Once the image processing unit has received the sensor values, sent by the at least one sensor, a driving dynamic parameter that corresponds to the sensor values is read from the storage unit and used to influence the grading depth in the image grading process.

In principle, the camera that is used in the device, according to the invention, may be of any nature. It is preferred that the camera be designed as an infrared camera and/or a camera that is sensitive to visible light. The device, according to the invention, may also be designed with more than one camera. In this case, it is contemplated that the inventive device exhibits camera models that are sensitive to a number of different spectral ranges.

The same advantages, as described above in connection with the inventive device, are associated with the method, according to the invention. In the inventive method for monitoring the surroundings of a vehicle with a device having at least one camera, one image processing unit, and a means for reducing the noise components in the images recorded by the camera, and including one image display unit, the means for reducing the noise components carry out a reduction in the noise components by image grading. At the same time, the image grading includes an averaging of a number of images; and the number of images that are processed for the image grading is variable.

According to a preferred design of the method, an adaptive adaptation of the number of images that are processed for image grading ensues as a function of at least one driving dynamic parameter of the vehicle.

The speed of the vehicle, the steering wheel angle of the vehicle, and/or the yaw rate of the vehicle are considered to be the parameters. In addition, other driving dynamic parameters, which are captured by the sensors of the vehicle, may also be used for influencing the image grading.

Other objects, advantages and novel features of the present invention will become apparent from the following detailed description of the invention when considered in conjunction with the accompanying drawings.

BRIEF DESCRIPTION OF THE DRAWING

The FIGURE is a schematic drawing of an inventive device for monitoring the surroundings of a vehicle.

DETAILED DESCRIPTION OF THE DRAWING

Referring to the FIGURE, a camera 2, which is sensitive to visible and/or infrared light, is coupled to an image processing unit 3. The camera 2 may be mounted in any position on the vehicle and may record that area of the vehicle that is located in the opposite direction of travel and for monitoring the surroundings in the direction of travel. The image processing unit 3 receives the images of the surroundings of a vehicle that are captured by the camera 2.

The images, received by the image processing unit 3, are subjected to a noise optimization procedure that is called image grading, which is an averaging and/or integration of a number of images over time. Image grading is used to enhance the signal-to-noise ratio in order to display qualitatively high quality images on an image display unit 4 of the vehicle, the image display unit 4 being coupled to the image processing unit 3.

Since the images, recorded by the camera 2, out of a vehicle can exhibit a number of different solid angles, the images may be blurred, chiefly at the edges, during a conventional image grading, which always uses the same number of images. In order to avoid this blurring, the image processing unit 3 is coupled, for example, to three sensors 5, 6, 7, which capture again, for example, the speed of the vehicle, the steering wheel angle of the vehicle, and the yaw rate. If the sensor values, supplied by these sensors 5, 6, 7, for determining a parameter for influencing the number of images that are processed for image grading, are taken into consideration, then the images, displayed in the image display unit 4, can be optimized to match the situation. Preferably, the result will be an adaptive adaptation of the grading depth as a function of the current speed and the steering wheel angle and/or the yaw rate of the vehicle.

In a first example of the application, at a low vehicle speed and simultaneously a low steering wheel angle, a high grading depth (that is, a large number of images are chosen that are subjected to averaging) is preferred, in order to achieve maximum noise optimization. In this case, the described situation corresponds to driving straight ahead in the city. Therefore, a high integration time is possible, since the individual images, recorded by the camera 2, come from approximately the same solid angle, thus exhibiting only slight blurring.

According to a second example of the application, at a low speed and a large steering wheel angle, a significantly reduced integration time is preferred, in order to avoid a "smearing" in the image display unit when driving along a curve. This situation corresponds to the vehicle turning off into the city at a high yaw rate and/or large steering wheel angle. The resulting raised noise component does not automatically decrease the driver's ability to interpret the image content, since the human eye is capable of reacting in a very sensitive way to relative movements.

According to a third example of the application, at a high speed of the vehicle and a small steering wheel angle, a medium integration time and/or grading depth is chosen, in order to avoid a "smearing" in the edge areas of the image. This third example of the application corresponds to driving cross-country or on freeways, for example.

The device, according to the invention, offers a compromise between the sensor noise of a camera and the image quality that can be achieved. One special advantage lies in the possibility of using sensors that have poorer noise ratios, since the variable image grading compensates for the sensor's properties. The result is that the cost of the whole system is less. Furthermore, through adaptation with the aid of a number of different driving dynamic parameters, which are usually available in the vehicle in any event, it is possible to prevent the image quality from deteriorating with a fast moving image content.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for monitoring surroundings of a vehicle, comprising:
    at least one camera;
    an image processing unit operatively configured to receive an output of the camera;
    an image display unit operatively configured to receive an output of the image processing unit; and
    at least one sensor that captures driving dynamic data and is coupled to the image processing unit;
    wherein the image processing unit is operatively configured to perform image grading for reducing noise components in images recorded by the camera, said image grading averaging a number of images recorded by the camera;
    wherein the number of images averaged during the image grading is variable; and
    wherein the image processing unit performs the image grading by carrying out an adaptive adaptation of the number of images as a function of at least one driving dynamic parameter of the vehicle that is determined based on the driving dynamic data captured by the at least one sensor.

2. The device according to claim 1, wherein the at least one driving dynamic parameter that influences the number of images processed for the image grading is computed via a processor of the image processing unit.

3. The device according to claim 1, wherein a plurality of driving dynamic parameters are stored in a storage unit of the image processing unit, said parameters being readable by the image processing unit as a function of one or more sensor values received by the image processing unit for further processing.

4. The device according to claim 1, wherein the at least one sensor is a speed sensor, and the at least one driving dynamic parameter is a function of a speed value determined by the speed sensor.

5. The device according to claim 3, wherein the at least one sensor is a speed sensor, and the at least one driving dynamic parameter is a function of a speed value determined by the speed sensor.

6. The device according to claim 1, wherein the at least one sensor is a steering wheel angle sensor, and the at least one driving dynamic parameter is a function of a steering wheel angle determined by the steering wheel angle sensor.

7. The device according to claim 3, wherein the at least one sensor is a steering wheel angle sensor, and the at least one driving dynamic parameter is a function of a steering wheel angle determined by the steering wheel angle sensor.

8. The device according to claim 1, wherein the at least one sensor comprises a speed sensor and a steering wheel angle sensor, and the at least one driving dynamic parameter is a function of a speed value determined by the speed sensor and a steering wheel angle determined by the steering wheel angle sensor.

9. The device according to claim 1, wherein the at least one sensor is a vehicle yaw rate sensor, and the at least one driving dynamic parameter is a function of a yaw rate value determined by the vehicle yaw rate sensor.

10. The device according to claim 1, wherein the at least one sensor comprises a speed sensor and a vehicle yaw rate sensor, and the at least one driving dynamic parameter is a function of a speed value determined by the speed sensor and a yaw rate value determined by the vehicle yaw rate sensor.

11. The device according to claim 1, wherein the at least one sensor comprises a speed sensor, a steering wheel angle sensor, and a vehicle yaw rate sensor, and the at least one driving dynamic parameter is a function of a speed value determined by the speed sensor, a steering wheel angle determined by the steering wheel angle sensor, and a yaw rate value determined by the vehicle yaw rate sensor.

12. The device according to claim 1, wherein the at least one camera comprises at least one of an infrared camera and a camera sensitive to visible light.

13. A method for monitoring surroundings of a vehicle using a system including a camera, an image processing unit and an image display unit, the method comprising the acts of:
    receiving a number of images from the camera, wherein the images contain noise components;
    receiving driving dynamic data captured by at least one sensor of the vehicle;
    selecting a variable number of the images for further processing by carrying out an adaptive adaptation of the number of images as a function of at least one driving dynamic parameter of the vehicle that is determined based on the driving dynamic data captured by the at least one sensor; and
    image grading the selected variable number of images, via an averaging of the selected variable number of images, to reduce the noise components.

14. The method according to claim 13, wherein the at least one driving dynamic parameter is a vehicle speed.

15. The method according to claim 13, wherein the at least one driving dynamic parameter is a steering wheel angle of the vehicle.

16. The method according to claim 13, wherein the at least one driving dynamic parameter comprises a speed of the vehicle and a steering wheel angle of the vehicle.

17. The method according to claim 13, wherein the at least one driving dynamic parameter is a yaw rate of the vehicle.

18. The method according to claim 13, wherein the at least one driving dynamic parameter comprises a speed of the vehicle and a yaw rate of the vehicle.

19. The method according to claim 13, wherein the at least one driving dynamic parameter comprises a speed of the vehicle, a steering wheel angle of the vehicle, and a yaw rate of the vehicle.

* * * * *